United States Patent
Jong et al.

(10) Patent No.: US 11,652,415 B2
(45) Date of Patent: *May 16, 2023

(54) CURRENT SENSING TECHNIQUES FOR POWER CONVERTER CIRCUITS

(71) Applicant: Analog Devices, Inc., Wilmington, MA (US)

(72) Inventors: Owen Jong, San Jose, CA (US); Yingyi Yan, Fremont, CA (US); Ya Liu, Sunnyvale, CA (US); Jindong Zhang, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,000

(22) Filed: May 19, 2021

(65) Prior Publication Data

US 2022/0376620 A1 Nov. 24, 2022

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05); *H02M 1/0064* (2021.05); *H02M 3/1584* (2013.01)

(58) Field of Classification Search
CPC .... H02M 1/0003; H02M 1/0009; H02M 1/14; H02M 1/15; H02M 3/156; H02M 3/158; H02M 3/1582
See application file for complete search history.

(56) References Cited

U.S. PATENT DOCUMENTS

| 6,828,762 | B2 * | 12/2004 | Brkovic | ............ | H02M 3/33571 |
| | | | | | 323/266 |
| 7,005,835 | B2 | 2/2006 | Brooks et al. | | |
| 7,233,132 | B1 | 6/2007 | Dong et al. | | |
| 7,589,511 | B2 | 9/2009 | Dong et al. | | |

(Continued)

OTHER PUBLICATIONS

U.S. Appl. No. 17/714,937, filed Apr. 6, 2022, Current Sensing Techniques for Power Converter Circuits.

(Continued)

*Primary Examiner* — Matthew V Nguyen
(74) *Attorney, Agent, or Firm* — Schwegman Lundberg & Woessner, P.A.

(57) ABSTRACT

A current sensing technique for coupled inductors in switching regulator circuits, where the current sensing technique can provide the current information needed for a power converter design and can be implemented as a real-world solution. The current sensing techniques can provide complete information of the coupled inductor current, such as peak current, valley current, and intermediate ripples. The current sensing techniques can use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. In addition, the current sensing techniques of this disclosure can be extended to multi-phase operation, such as three or more phases.

20 Claims, 5 Drawing Sheets

(56) References Cited

U.S. PATENT DOCUMENTS

| | | | |
|---|---|---|---|
| 7,630,221 B2* | 12/2009 | Sui | H02M 1/4208 323/207 |
| 8,044,650 B2 | 10/2011 | Tang et al. | |
| 8,120,346 B2 | 2/2012 | Ostrom et al. | |
| 8,138,732 B2* | 3/2012 | Tseng | H02M 3/156 323/282 |
| 8,823,352 B2 | 9/2014 | Zhang | |
| 9,037,884 B2 | 5/2015 | Rahardjo et al. | |
| 9,520,788 B2 | 12/2016 | Kobayashi | |
| 9,525,351 B2 | 12/2016 | Li et al. | |
| 9,627,969 B2 | 4/2017 | Tschirhart et al. | |
| 9,748,843 B2 | 8/2017 | Zhang et al. | |
| 9,941,784 B1* | 4/2018 | Li | G01R 15/183 |
| 10,084,381 B2 | 9/2018 | Zhang et al. | |
| 10,483,847 B2 | 11/2019 | Tang et al. | |
| 10,483,860 B1* | 11/2019 | Xiao | H02M 3/33571 |
| 2011/0194317 A1* | 8/2011 | Truettner | H02M 3/33569 363/21.18 |
| 2016/0012965 A1* | 1/2016 | Jiang | H01F 27/402 336/105 |
| 2016/0187386 A1 | 6/2016 | El-damak et al. | |
| 2020/0088769 A1* | 3/2020 | Jin | H02M 3/33576 |
| 2022/0376600 A1 | 11/2022 | Jong et al. | |

OTHER PUBLICATIONS

"ISL6566: Three-Phase Buck PWM Controller with Integrated MOSFET Drivers for VRM9, VRM10, and AMD Hammer Applications", Intersil Data Sheet, (Mar. 9, 2006), 29 pgs.

"LTC3774: Dual, Multiphase Current Mode Synchronous Controller for Sub-Milliohm DCR Sensing", Linear Technology Data Sheet, (2013), 38 pgs.

"LTC3853: Triple Output, Multiphase Synchronous Step-Down Controller", Linear Technology Data Sheet, (2008), 36 pgs.

"LTC3882: Dual Output PolyPhase Step-Down DC/DC Voltage Mode Controller with Digital Power System Management", Linear Technology Data Sheet, (2014), 107 pgs.

"Multiphase Buck Voltage Mode DC/DC Controllers", Analog Devices Inc., [Online] Retrieved from the Internet: <URL: https://www.mouser.com/new/analog-devices/adi-multiphase-dc-dc-controllers/>, (Sep. 2, 2020), 3 pgs.

"VRD11/VRD10, K8 Rev F 2/3/4-Phase PWM Controllers with Integrated Dual MOSFET Drivers", Maxim Integrated Products, Inc., (2006), 50 pgs.

"ZL8801: Dual Phase PMBus ChargeMode Control DC/DC Digital Controller", Renesas Data Sheet, (Mar. 27, 2015), 87 pgs.

Dong, Yan, et al., "DCR Current Sensing Method for Achieving Adaptive Voltage Positioning (AVP) in Voltage Regulators with Coupled Inductors", 37th IEEE Power Electronics Specialists Conference, (2006), 5 pgs.

Hegarty, Timothy, "3D-Integrated MOSFETs With Ultra-Low DCR Inductor Provides High-Efficiency DC/DC Regulator", Power Electronics, [Online] Retrieved from the Internet: <URL: https://www.powerelectronics.com/technologies/discrete-power-semis/article/21861337/3dintegrated-mosfets-with-ultralow-dcr-inductor-provides-highefficiency-dcdc-regulator, (Nov. 13, 2013), 22 pgs.

Hegde, Krishnamurthy, "TPS65311-Q1 BUCK1 Controller DCR Current Sensing", Texas Instruments Application Report SLVA791, (Sep. 2016), 9 pgs.

Oraw, Bradley, et al., "Lossless DCR Current Sensing for Multi-Winding Coupled Inductors", IEEE 30th International Telecommunications Energy Conference (INTELEC), (2008), 6 pgs.

Xu, Ming, et al., "Novel Coupled-Inductor Muiti-phase VRs", 22nd Annual IEEE Applied Power Electronics Conference and Exposition (APEC), (2007), 113-119.

Zhang, Henry, et al., "Switch Mode Power Supply Current Sensing—Part 3: Current Sensing Methods", Analog Devices Technical Article, (2018), 4 pgs.

Zhu, Guangyong, et al., "Modeling and Design Considerations of Coupled Inductor Converters", 25h Annual IEEE Applied Power Electronics Conference and Exposition (APEC), (2010), 7 pgs.

* cited by examiner

CURRENT SENSING TECHNIQUES FOR POWER CONVERTER CIRCUITS

FIELD OF THE DISCLOSURE

This document pertains generally, but not by way of limitation, to power converter circuits.

BACKGROUND

One of the most common challenges in designing portable electronic devices is the generation and maintenance of a regulated voltage from an unregulated voltage source, such as a battery. Typically, a voltage regulator is used for this purpose. A voltage regulator may be designed as a linear regulator or a switching regulator.

A linear regulator provides closed loop control to regulate the voltage at the load. This type of regulator may be used to provide a constant output voltage that has a lower magnitude than the unregulated voltage source.

In contrast, a switching regulator uses an energy-storage element, such as an inductor, to transfer energy from the unregulated power source to the load in discrete bursts. Feedback circuitry may be used to regulate the energy transfer to maintain a constant voltage at the load. Because the switching regulator operates to transfer energy in discrete bursts, it can be configured to step-up or step-down the voltage of the unregulated voltage source. Moreover, switching regulators are generally more efficient than linear regulators.

Various types of switching regulators are commonly used today in portable electronic devices. A buck converter is an inductor-based regulator used to step-down or buck the unregulated voltage source. A boost converter is an inductor-based regulator used to step-up or boost the unregulated voltage source. In some applications, a buck-boost converter may be used to provide a regulated output that is higher, lower or the same as the unregulated voltage source.

Current-mode control can be used for switching regulators due to its high reliability, simple loop compensation design, and simple and reliable load sharing capability. The current sense signal can be an important part of a current-mode switch mode power supply design; it is used to regulate the output and also provides overcurrent protection.

SUMMARY OF THE DISCLOSURE

This disclosure describes a current sensing technique for coupled inductors in switching regulator circuits, where the current sensing technique can provide the current information needed for a power converter design and can be implemented as a real-world solution. The current sensing techniques of this disclosure can provide complete information of the coupled inductor current, such as peak current, valley current, and intermediate ripples, which is needed for power converter design, both in control and protection. The current sensing techniques of this disclosure use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. In addition, the current sensing techniques of this disclosure can be extended to multi-phase operation, such as three or more phases.

In some aspects, this disclosure is directed to a circuit comprising: a first coupled inductor including a first winding and a second winding; a first sensing network coupled with the first coupled inductor, the first sensing network including: a first resistor coupled to receive a signal representing voltage information at an input of the first winding; a second resistor coupled to receive a signal representing voltage information at an input of the second winding; a first capacitor coupled between the first resistor and a first sensing node; and a second capacitor coupled between the second resistor and a second sensing node, and a control circuit coupled with the first sensing node and the second sensing node, the control circuit to: receive a first voltage across the first capacitor, wherein the first voltage represents a current through the first winding of the first coupled inductor.

In some aspects, this disclosure is directed to a method of sensing inductor winding current in a coupled inductor including a first winding and a second winding, the method including: coupling a first resistor to receive a signal representing voltage information at an input of the first winding; coupling a second resistor to receive a signal representing voltage information at an input of the second winding; coupling a first capacitor between the first resistor and a first sensing node; coupling a second capacitor between the second resistor and a second sensing node, wherein a sensing network includes the first resistor, the second resistor, the first capacitor, and the second capacitor; and receiving a first voltage across the first capacitor, wherein the first voltage represents a current through the first winding of the coupled inductor.

In some aspects, this disclosure is directed to a circuit comprising: a first coupled inductor including a first winding and a second winding; a first sensing network coupled with the first coupled inductor, the first sensing network including: a first resistor coupled with an input of the first winding; a second resistor coupled with an input of the second winding; a first capacitor coupled between the first resistor and a first sensing node; and a second capacitor coupled between the second resistor and a second sensing node, and a control circuit coupled with the first sensing node and the second sensing node, the control circuit to: receive a first voltage across the first capacitor, wherein the first voltage represents a current through the first winding of the first coupled inductor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Current-mode control can be used for switching regulators due to its high reliability, simple loop compensation design, and simple and reliable load sharing capability. A current sense signal can be an important part of a current-mode switch mode power supply design because it is used to regulate the output and can also provide overcurrent protection. Current information that can be sensed include the peak inductor current, the valley inductor current (the minimum value of the inductor current when in continuous conduction mode) and the average output current.

In some switching regulator circuits, it can be desirable to utilize coupled inductors, rather than individual inductors, as energy-storage elements to transfer energy from the unregulated power source to the load in discrete bursts. Coupled inductors can provide higher efficiency and better transient response while reducing the size of solution.

Some approaches to current sensing for coupled inductors in switching regulator circuits provide only some of the current information needed for a power converter design. In other approaches, such as theoretical approaches, to current sensing for coupled inductors in switching regulator circuits, all of the current information needed can be acquired, but the current sensing design is overly complicated and not implementable as a real-world solution.

The present inventors have recognized a need for a current sensing technique for coupled inductors in switching regulator circuits, where the current sensing technique can provide the current information needed for a power converter design and can be implemented as a real-world solution. The current sensing techniques of this disclosure can provide complete information of the coupled inductor current, such as peak current, valley current, and intermediate ripples, which is needed for power converter design, both in control and protection. The current sensing techniques of this disclosure use a simple RC network, such as two resistors and two capacitors for 2-phase operation. The techniques, however, are not limited to two-phase operation. The current sensing techniques of this disclosure can be extended to power stage assembly implementations, e.g., DrMOS modules, with current output in order to increase signal-to-noise ratio, which is significant for reliable control. In addition, the current sensing techniques of this disclosure can be extended to multi-phase operation, such as three or more phases.

Figure 1:
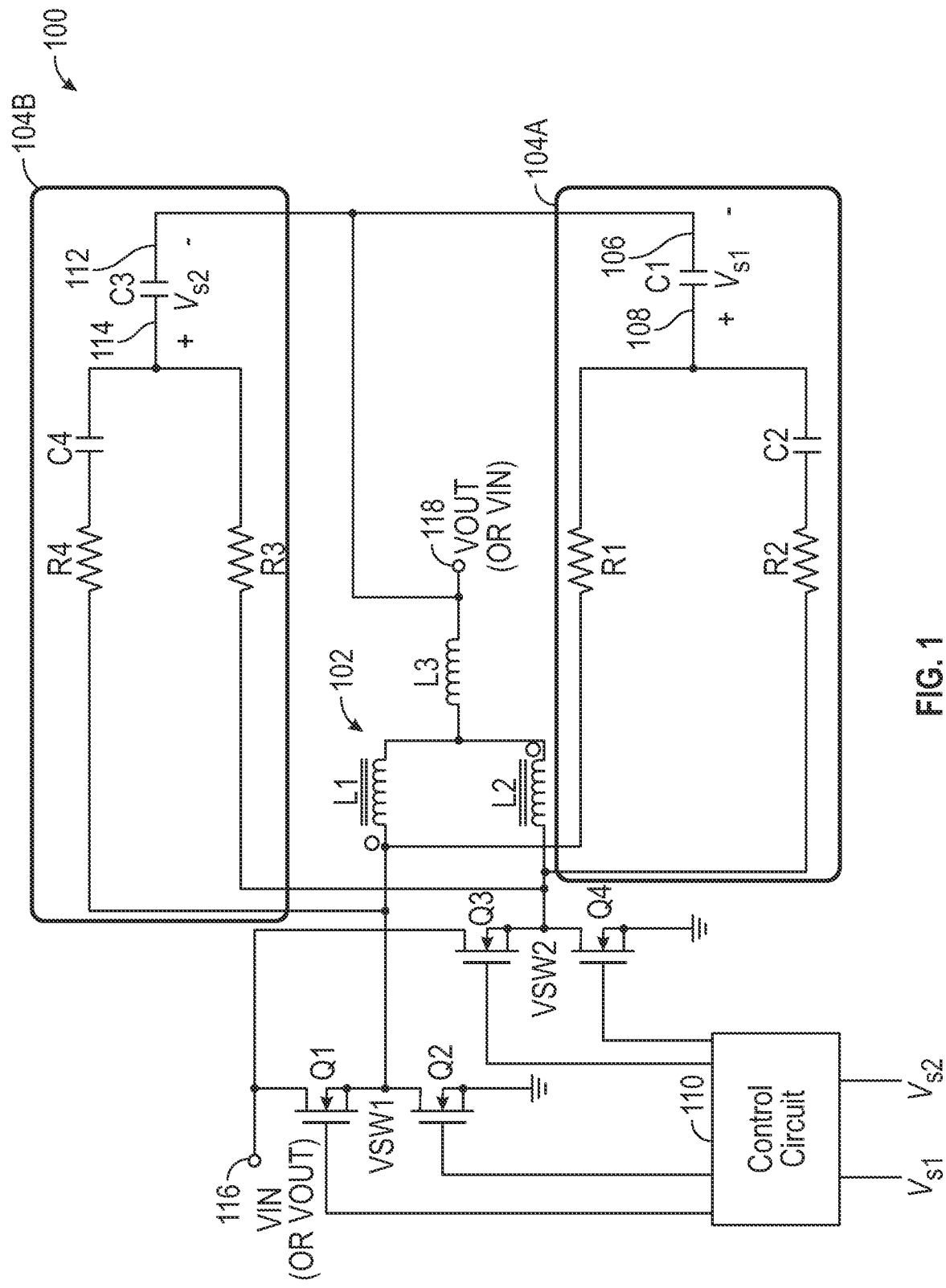
FIG. 1 is an example of a current sensing circuit for use with a coupled inductor that can implement various techniques of this disclosure.

FIG. 1 is an example of a current sensing circuit for use with a coupled inductor that can implement various techniques of this disclosure. The current sensing circuit 100 can include a first coupled inductor 102 including a first winding L1 and a second winding L2 and a first sensing network 104A coupled with the first coupled inductor 102.

The first sensing network 104A can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 106, and a second capacitor C2 coupled between the second resistor R2 and a second sensing node 108. In the example shown in FIG. 1, the first resistor R1 is coupled with an input of the first winding L1, and the second resistor R2 is coupled with an input of the second winding L2.

Current sensing information about the inductor current through the first winding L1 can be obtained by sensing a voltage $Vs_1$ across the second capacitor C2, where the voltage $Vs_1$ represents a current through the first winding L1 of the first coupled inductor 102. As shown in FIG. 1, a control circuit 110, e.g., a multi-phase controller, can receive the first voltage $Vs_1$ across the first capacitor C1 and can determine information about the coupled inductor current, such as peak current, valley current, and intermediate ripples.

In some non-limiting implementations, the current sensing techniques of this disclosure can be used to sense current information in switching regulators. In the example shown in FIG. 1, the circuit 100 can include a first switching circuit including a first switching element Q1 and a second switching element Q2 and a second switching circuit including a third switching element Q3 and a fourth switching element Q4. In some examples, the switching elements Q1-Q4 can be transistors, such as field-effect transistors (FET).

As seen in FIG. 1, the first winding L1 of the coupled inductor 102 can be coupled to a first switching node VSW1 between the first switching element Q1 and the second switching element Q2. Similarly, the second winding L2 of the coupled inductor 102 can be coupled to a second switching node VSW2 between the third switching element Q3 and the fourth switching element Q4.

The control circuit 110 can be coupled with the first switching circuit and the second switching circuit. The control circuit 110 can control the operation of the switching elements Q1-Q4 using a timing phase, e.g., pulse-width modulated (PWM) signal, such as by applying control signals to their corresponding control terminals, e.g., gate terminal of a FET.

In some examples, the first switching circuit and the second switching circuit can be arranged in a buck configuration. For example, a buck configuration can be implemented by applying an input voltage VIN at node 116 with an output voltage VOUT generated at node 118.

In other examples, the first switching circuit and the second switching circuit can be arranged in a boost configuration. For example, a boost configuration can be implemented by applying an input voltage VIN at node 118 with an output voltage VOUT generated at node 116.

In some examples, the circuit 100 can include a second sensing network 104B for sensing inductor current through the second winding L2 of the coupled inductor 102. The second sensing network 104B can be similar to the first sensing network 104A and can include a third resistor R3 coupled to receive a signal representing voltage information at an input of the second winding L2, a fourth resistor R4 coupled to receive a signal representing voltage information at an input of the first winding L1, a third capacitor C3 coupled between the third resistor R3 and a third sensing node 112, and a fourth capacitor C4 coupled between the fourth resistor R4 and a fourth sensing node 114. In the example shown in FIG. 1, the third resistor R3 is coupled with an input of the second winding L2, and the fourth resistor R4 is coupled with an input of the first winding L.

Current sensing information about the inductor current through the second winding L2 can be obtained by sensing a voltage $Vs_2$ across the second capacitor C2, where the voltage $Vs_1$ represents a current through the first winding L1 of the first coupled inductor 102. As shown in FIG. 1, a control circuit 110 can receive the first voltage $Vs_1$ across the third capacitor C3 and can determine information about the coupled inductor current, such as peak current, valley current, and intermediate ripples.

Figure 2:
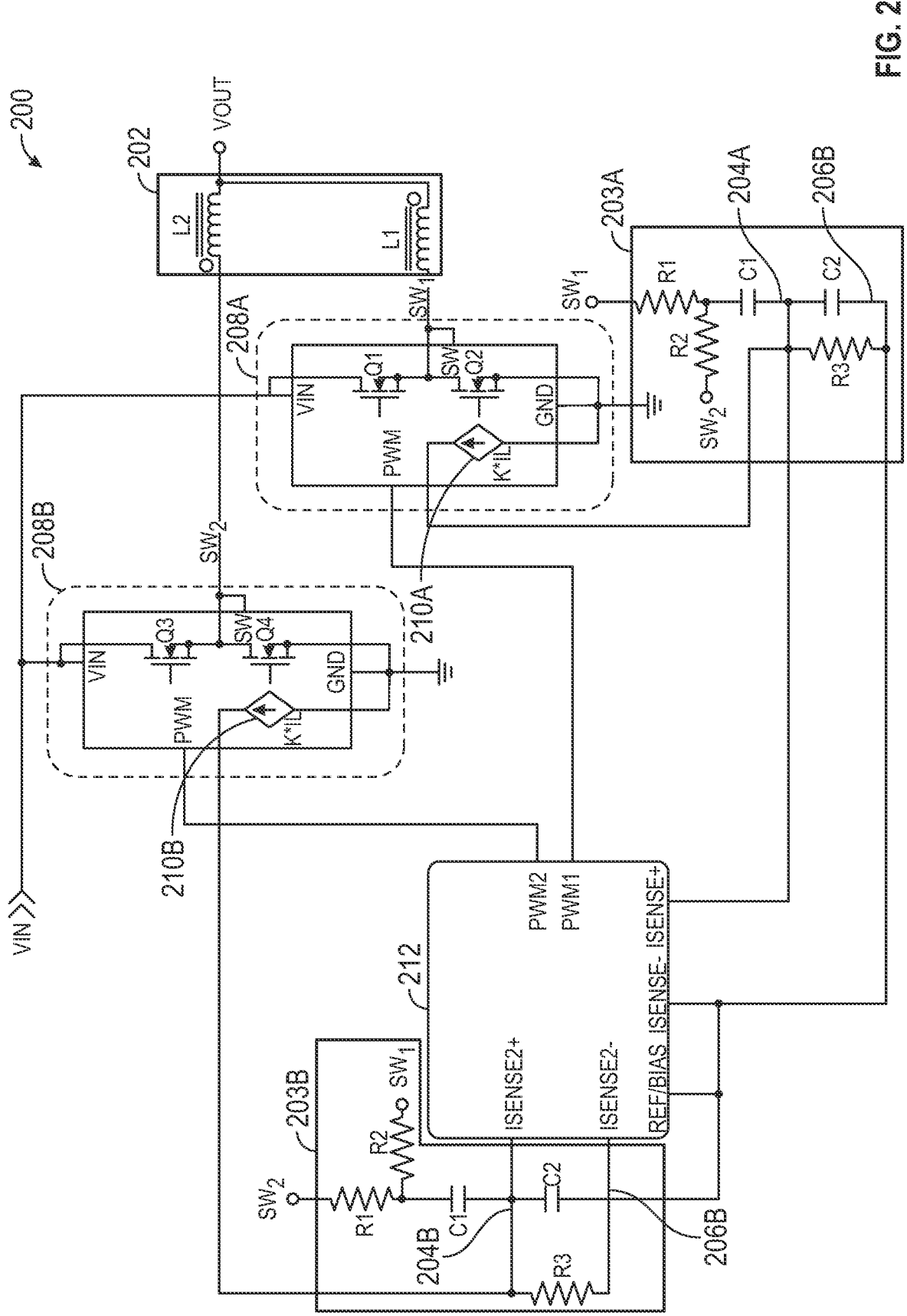
FIG. 2 is another example of a current sensing circuit for use with a coupled inductor that can implement various techniques of this disclosure.

FIG. 2 is another example of a current sensing circuit for use with a coupled inductor that can implement various techniques of this disclosure. As mentioned above, the current sensing techniques can be extended to power stage assembly implementations, e.g., DrMOS modules, with current output in order to increase signal-to-noise ratio, which is significant for reliable control. The current sensing circuit 200 of FIG. 2 can be used along with a power stage assembly, such as a driver FET (DrMOS) module. The current sensing circuit 200 can include a first coupled inductor 202 including a first winding L1 and a second winding L2 and a first sensing network 203A coupled with the first coupled inductor 202.

The first sensing network 203A can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 204A, and a second capacitor C2 coupled between the second resistor R2 and a second sensing node 206A. In the example shown in FIG. 2, the first resistor R1 is coupled with an input of the first winding L1, and the second resistor R2 is coupled with an input of the second winding L2.

In the example shown in FIG. 2, the first resistor R1 and the second resistor R2 share the first capacitor C1. In some examples, rather than sharing the first capacitor C1, a third capacitor can be coupled between the second resistor R2 and the second sensing node 206A and the connection between the second resistor R2 and the first capacitor C1 can be removed.

The circuit 200 can include a first power stage assembly 208A, such as a DrMOS module. The first power stage assembly 208A can include a first switching circuit including a first switching element Q1 and a second switching element Q2. The first winding L1 of the coupled inductor 202 can be coupled to a first switching node SW1 between the first switching element Q1 and the second switching element Q2, like in FIG. 1.

The first power stage assembly 208A can also include a first signal source 210A. The first signal source 210A can output a first representation of a current through the first winding L1 of the first coupled inductor 202, where the representation includes a DC component of the current through the first winding of the first coupled inductor. For example, the first signal source 210A can output a first representation of the current through the first winding L1, where the first representation is a scaling factor K multiplied by the inductor current $i_L$ through the first winding L1 ($K \times i_L$). The DC component of the current is achieved by ($K \times i_L$)×R3, with the second capacitor C2 acts as a filter for ($K \times i_L$)×R3. A control circuit 212, e.g., a multi-phase controller, can receive the first representation of the current.

The AC component of the inductor current $i_L$ through the first winding L1 can be determined using the R1, C1 path. As seen in FIG. 2, a control circuit 212 can receive the current sensing information about the inductor current through the first winding L1, which can be obtained by sensing a voltage across the second capacitor C2, where the voltage across the second capacitor C2 represents a current through the first winding L1 of the first coupled inductor 202. The control circuit 212 can receive the voltage across the second capacitor C2 and can determine information about the coupled inductor current, such as peak current, valley current, and intermediate ripples.

The circuit 200 can include a second power stage assembly 208B, such as a DrMOS module. The second power stage assembly 208B can include a second switching circuit including a third switching element Q1 and a fourth switching element Q2. The second winding L2 of the coupled inductor 202 can be coupled to a second switching node SW2 between the third switching element Q1 and the fourth switching element Q2, like in FIG. 1.

The second power stage assembly 204A can also include a second signal source 210B that can output a second representation of a current through the second winding L2 ($K \times i_L$) of the first coupled inductor 202, where the representation includes a DC component of the current through the second winding of the first coupled inductor. The control circuit 212 can receive the second representation of the current. The AC component of the inductor current $i_L$ through the second winding L2 can be determined using the R2, C1 path. In a buck configuration, an output voltage can be generated at node Vo in FIG. 2.

The current sensing circuit 200 can include a second sensing network coupled 203B with the first coupled inductor 202. Like the first sensing network 203A, the second sensing network 203B can include a first resistor R1 coupled to receive a signal representing voltage information at an input of the first winding L1, a second resistor R2 coupled to receive a signal representing voltage information at an input of the second winding L2, a first capacitor C1 coupled between the first resistor R1 and a first sensing node 204B, and a second capacitor C2 coupled between the second resistor R2 and a second sensing node 206B. In the example shown in FIG. 2, the first resistor R1 is coupled with an input of the second winding L2, and the second resistor R2 is coupled with an input of the first winding L1.

Current sensing information about the inductor current through the first winding L1 can be obtained by sensing a voltage across the capacitor C2 of the first sensing network 203A. Current sensing information about the inductor current through the second winding L2 can be obtained by sensing a voltage across the capacitor C2 of the second sensing network 203B. As shown in FIG. 2, a control circuit 212 can receive the voltage across these capacitors and can determine information about the coupled inductor current, such as peak current, valley current, and intermediate ripples.

Figure 3:
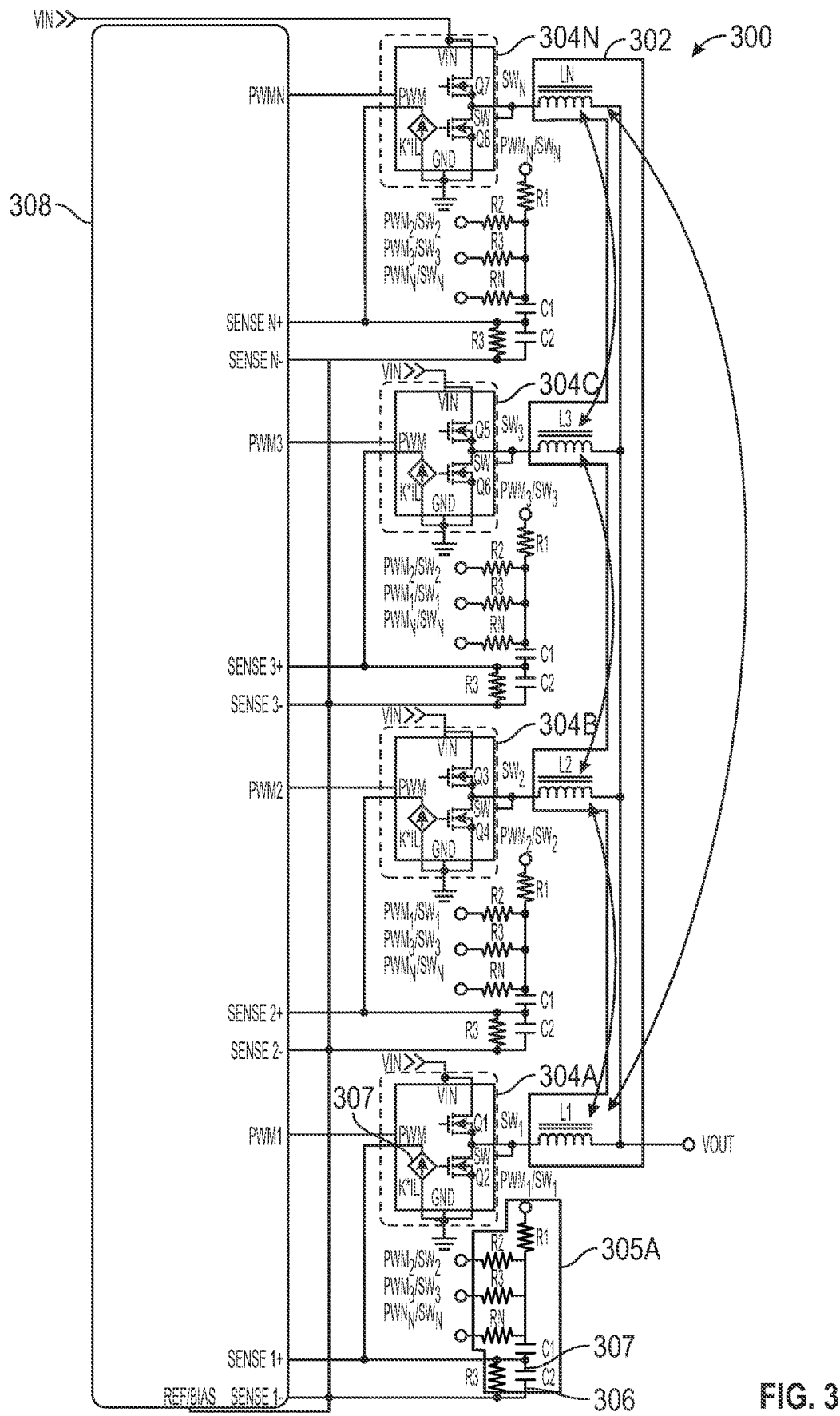
FIG. 3 is another example of a current sensing circuit for use with a coupled inductor that can implement various techniques of this disclosure.

FIG. 3 is another example of a current sensing circuit for use with a coupled inductor that can implement various techniques of this disclosure. The current sensing circuit 300 of FIG. 3 can be used along with a power stage assembly, such as a driver FET (DrMOS) module. The current sensing circuit 300 of FIG. 3 is similar to the circuit 200 of FIG. 2, but shows N phases. Using the current sensing technique of FIG. 3, the current sensing circuit can use each PWMN or switch node signal (SWN) to determine the current through each winding of a coupled inductor. The example of a current sensing circuit 300 can include a first coupled inductor 302 including a first winding L1 and a first sensing network coupled with the first coupled inductor 302.

The circuit 300 can include a first power stage assembly 304A, such as a DrMOS module. The first power stage assembly 304A can include a first switching circuit including a first switching element Q1 and a second switching element Q2. The first winding L1 of the coupled inductor 302 can be coupled to a first switching node SW1 between the first switching element Q1 and the second switching element Q2.

The first sensing network 305A can include a first resistor R1 coupled to receive a signal representing voltage information at an input of the first winding L1, a second resistor R2 coupled to receive a signal representing voltage information at an input of a second winding L2 of the first coupled inductor 302, a first capacitor C1 coupled between the first resistor R1 and a first sensing node 306, and a second capacitor C2 coupled between the second resistor R2 and a second sensing node 307.

In contrast to FIG. 2 in which the first resistor R1 is coupled with an input of the first winding L1, the first resistor R1 in the example shown in FIG. 3 is coupled to receive an output of the control circuit 308, e.g., a multi-phase controller. The control circuit 308 can reproduce the switch node voltage SW1 by multiplying the input voltage and the PWM signal (PWM1) that the control circuit 308 generates to control the switching elements Q1 and Q2 of the first power stage assembly 304A. The first resistor R1 can be connected to receive the reproduced switch node voltage SW1.

For each additional phase of a multi-phase buck or boost converter, a corresponding additional power stage assembly is needed, shown as 304B-304N, coupled to the control circuit 308. The control circuit 308 can send a PWM signal that corresponds to each power stage assembly. Like with the first resistor R1, the second resistor R2 can be coupled with a second output of the control circuit 308. For example, a second power stage assembly 304B like the first power stage assembly 304A can be included. The second power stage assembly 304B can include two switching elements with a second switch node voltage SW2 therebetween. The control circuit 308 can reproduce the second switch node voltage SW2 by multiplying the input voltage and a second PWM signal (PWM2) that the control circuit 308 generates to control the switching elements of the second power stage assembly. The second resistor R2 can be connected to receive the reproduced switch node voltage SW2. The control circuit 308 can receive the current information through each corresponding additional winding, such as windings L2 and L3, of the coupled inductor 302. The techniques of FIG. 3 are not limited to coupled inductors with one, two, or three windings. Rather, the techniques can be extended to N windings.

For each additional phase of a multi-phase buck or boost converter, corresponding additional second resistors R2A-R2N can be included and connected to receive a reproduced switch node voltage corresponding to the phase. For example, the coupled inductor 302 can include a third winding L3, and the first sensing network 305A can include resistor R2A coupled in parallel with the second resistor R2, where the resistor R2A is coupled to a third output of the control circuit and coupled to receive a signal representing voltage information at an input of the third winding L3. That is, the control circuit 308 can reproduce a third switch node voltage SW3 of a third power stage assembly 304C by multiplying the input voltage and a third PWM signal (PWM3) that the control circuit 308 generates to control the switching elements of the third power stage assembly 304C. The resistor R2A can be connected to receive the reproduced switch node voltage SW3.

The first power stage assembly 304A can also include a first signal source 307. The first signal source 307 can output a first representation of a current through the first winding L1 of the first coupled inductor 302, where the representation includes a DC component of the current through the first winding of the first coupled inductor. For example, the first signal source 307 can output a first representation of the current through the first winding L1, where the first representation is a scaling factor K multiplied by the inductor current $i_L$ through the first winding L1 ($K \times i_L$). The DC component of the current is achieved by ($K \times i_L$)×R3, with the second capacitor C2 acts as a filter for ($K \times i_L$)×R3. The control circuit 308, e.g., a multi-phase controller, can receive the first representation of the current.

The AC component of the inductor current $i_L$ through the first winding L1 can be determined using the R1, C1 path. As seen in FIG. 3, the control circuit 308 can receive the current sensing information about the inductor current through the first winding L1, which can be obtained by sensing a voltage across the second capacitor C2, where the voltage across the second capacitor C2 represents a current through the first winding L1 of the first coupled inductor 302. The control circuit 308 can receive the voltage across the second capacitor C2 and can determine information about the coupled inductor current, such as peak current, valley current, and intermediate ripples.

As seen in FIG. 3, additional sensing networks, similar to the first sensing network 305A, can be included for each of the N phases.

Figure 4:
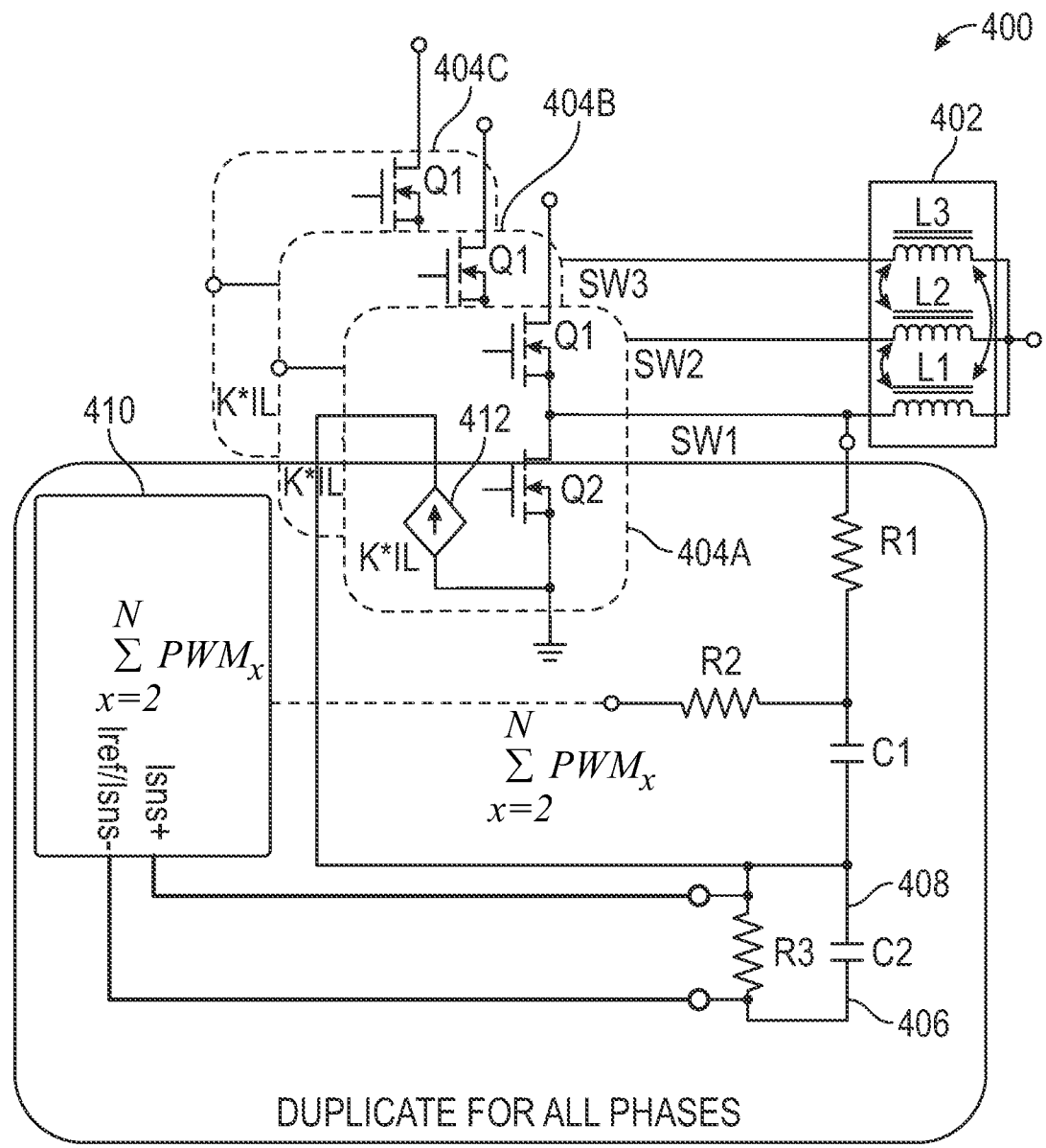
FIG. 4 is another example of a current sensing circuit for use with a coupled inductor that can implement various techniques of this disclosure.

FIG. 4 is another example of a current sensing circuit for use with a coupled inductor that can implement various techniques of this disclosure. The current sensing circuit 400 of FIG. 4 can be used along with a power stage assembly, such as a driver FET (DrMOS) module. Using the current sensing technique of FIG. 4, the current sensing circuit can sum the PWM or switch node signals (VSW) to determine the current through each winding of a coupled inductor. The example of a current sensing circuit 400 can include a first coupled inductor 402 including a first winding L1, a second winding L2, and a third winding L3 and a first sensing network coupled with the first coupled inductor 302. The techniques of FIG. 3 are not limited to coupled inductors with one, two, or three windings. Rather, the techniques can be extended to N windings.

For a 3-phase implementation, the circuit 400 can include power stage assemblies 404A-404C, such as DrMOS modules. Each power stage assembly can include a first switching circuit including a first switching element Q1 and a second switching element Q2. Referring to the first power stage assembly 404A, the first winding L1 of the coupled inductor 402 can be coupled to a first switching node SW1 between the first switching element Q1 and the second switching element Q2. The windings L2, L3 of the coupled inductor 402 can be similarly coupled with power stage assemblies 404B, 404C, respectively.

The circuit 400 can include sensing networks similar to those described above. For example, a first sensing network can include a first resistor R1 coupled to receive a signal representing voltage information at an input of the first winding L1, a second resistor R2 coupled to receive a signal representing voltage information at an input of a second winding L2 of the first coupled inductor 302, a first capacitor C1 coupled between the first resistor R1 and a first sensing node 406, and a second capacitor C2 coupled between the second resistor R2 and a second sensing node 408. In the example shown in FIG. 4, the first resistor R1 is coupled with an input of the first winding L1, unlike in FIG. 3. The sensing network shown can be duplicated for each of the phases.

The first power stage assembly 404A, such as a DrMOS module, can include a first switching circuit including a first switching element Q1 and a second switching element Q2. The first winding L1 of the coupled inductor 202 can be coupled to a first switching node SW1 between the first switching element Q1 and the second switching element Q2. The power stage assemblies 404B, 404C can be similarly configured.

In contrast to FIG. 2 in which the resistors R2 and R2A-R2N were each connected to a corresponding output of the control circuit, in FIG. 4, the resistor R2 of a sensing network receives the sum of the reproduced switch node voltages of the other phases (phases 2 and 3). For example, the control circuit 410 can reproduce the switch node voltage SW2 at an input of the second winding L2 by multiplying the input voltage and the PWM signal (PWM2) that the control circuit 410 generates to control the switching elements Q1, Q2 of the second power stage assembly 404B. Similarly, the control circuit 410 can reproduce the switch node voltage SW3 at an input of the third winding L3 by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2. In this manner, the control circuit is configured to generate a signal representing a combination of information about the second winding L2 and the third winding L3.

The first power stage assembly 404A can also include a first signal source 412. The first signal source 412 can output a first representation of a current through the first winding L1 of the first coupled inductor 402, where the representation includes a DC component of the current through the first winding L1 of the first coupled inductor. For example, the first signal source 412 can output a first representation of the current through the first winding L1, where the first representation is a scaling factor K multiplied by the inductor current $i_L$ through the first winding L1 ($K \times i_L$). The DC component of the current is achieved by ($K \times i_L$)×R3, with the second capacitor C2 acts as a filter for ($K \times i_L$)×R3. The control circuit 410, e.g., a multi-phase controller, can receive the first representation of the current.

The AC component of the inductor current $i_L$ through the first winding L1 can be determined using the R1, C1 path. As seen in FIG. 4, the control circuit 410 can receive the current sensing information about the inductor current through the first winding L1, which can be obtained by sensing a voltage across the second capacitor C2, where the voltage across the second capacitor C2 represents a current through the first winding L1 of the first coupled inductor 402. The control circuit 410 can receive the voltage across the second capacitor C2 and can determine information about the coupled inductor current, such as peak current, valley current, and intermediate ripples.

For each additional phase of a multi-phase buck or boost converter, corresponding sensing networks can be included. For example, a similar configuration of R1, R2, R3, C1, C2 can be included and coupled to the second winding L2. The resistor R2 of a second sensing network receives the sum of the reproduced switch node voltages of the other phases (phases 1 and 3). For example, the control circuit 410 can reproduce the switch node voltage SW1 by multiplying the input voltage and the PWM signal (PWM1) that the control circuit 410 generates to control the switching elements Q1, Q2 of the first power stage assembly 404A. Similarly, the control circuit 410 can reproduce the switch node voltage SW3 by multiplying the input voltage and the PWM signal (PWM3) that the control circuit 410 generates to control the switching elements Q1, Q2 of the third power stage assembly 404C. The control circuit 410 can combine that information digitally and output a current representing that combined information to the resistor R2.

A similar configuration of R1, R2, R3, C1, C2 can be included and coupled to the third winding L3. The control circuit 410 can similarly generate information for phases 1 and 2 and combine that information digitally and output a current representing that information to the resistor R2.

As noted in FIG. 4, additional corresponding control circuits and sensing networks can be included for each phase, similar to what is shown in FIG. 3.

Figure 5:
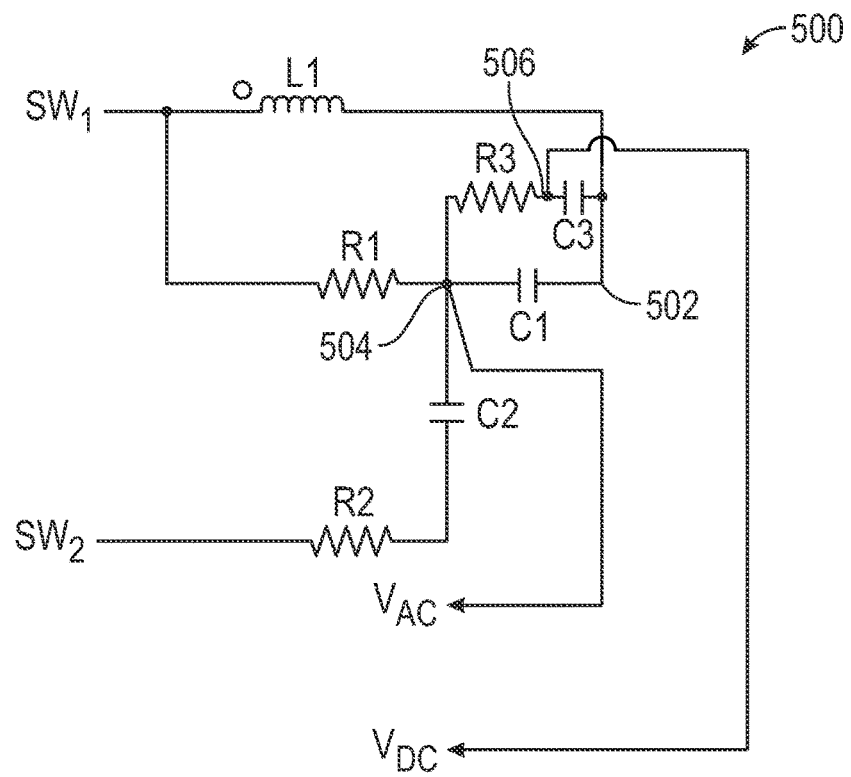
FIG. 5 is another example of a sensing network for use with a coupled inductor that can implement various techniques of this disclosure.

FIG. 5 is another example of a sensing network for use with a coupled inductor that can implement various techniques of this disclosure. In some examples, the sensing network 500 can be coupled to a buck or boost converter circuit, such as shown in FIG. 1. For example, the sensing network 500 can be coupled with switching nodes SW1 and SW2, which can each be a node between first and second switching elements, such as the first switching element Q1 and the second switching element Q2 in FIG. 1.

For simplicity, a single winding L1 of a coiled inductor is shown in FIG. 5. Like in FIG. 1, the sensing network 500 can include a first resistor R1 coupled to receive a signal representing voltage information at an input of the first winding L1, a second resistor R2 coupled to receive a signal representing voltage information at an input of the second winding, such as a second winding L2, a first capacitor C1 coupled between the first resistor R1 and a first sensing node 502, and a second capacitor C2 coupled between the second resistor R2 and a second sensing node 504.

The sensing network 500 can further include a third resistor R3 and a third capacitor C3 coupled in series, where the series connection of the third resistor R3 and the third capacitor C3 is coupled in parallel with the first capacitor C1 between the first sensing node 502 and the second sensing node 504. A control circuit, such as the control circuit 110 in FIG. 1, can receive the DC component of the inductor current $i_L$ through the first winding L1 by sensing at a node 506 between the third resistor R3 and the third capacitor C3. The control circuit can receive the AC component of the inductor current $i_L$ through the first winding L1 by sensing at the second sensing node 504.

Figure 6:
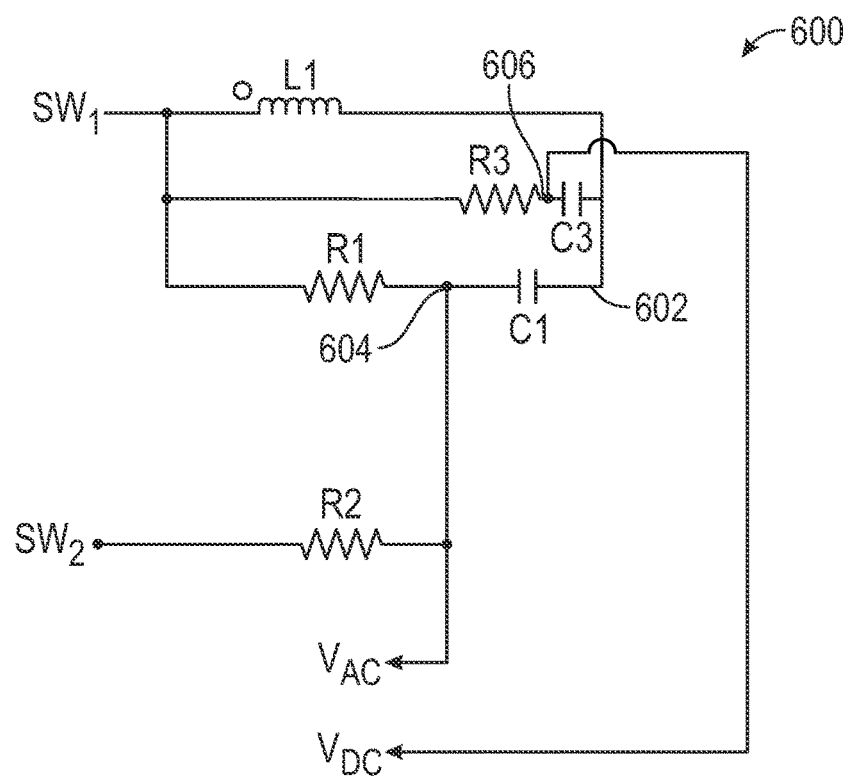
FIG. 6 is another example of a sensing network for use with a coupled inductor that can implement various techniques of this disclosure.

FIG. 6 is another example of a sensing network for use with a coupled inductor that can implement various techniques of this disclosure. The sensing network 600 can be a simplified version of the sensing network 500 of FIG. 5. The sensing network 600 of FIG. 6 eliminates the second capacitor C2 that was included in FIG. 5. In addition, the series connection of the third resistor R3 and the third capacitor C3 are coupled in parallel with the first resistor R1 and the first capacitor C1. In particular, the third resistor R3 is no longer connected between node 604 and node 606 and instead connected between switch node SW1 and node 606. The capacitor C1 is connected between sense nodes 602, 604.

A control circuit, such as the control circuit 110 in FIG. 1, can receive the DC component of the inductor current $i_L$ through the first winding L1 by sensing at a node 606 between the third resistor R3 and the third capacitor C3. The control circuit can receive the AC component of the inductor current $i_L$ through the first winding L1 by sensing at the sensing node 604.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

The claimed invention is:

1. A circuit comprising:
    a first coupled inductor including a first winding and a second winding;
    a first sensing network coupled with the first coupled inductor, the first sensing network including:
    a first resistor coupled to receive a signal representing voltage information at an input of the first winding;
    a second resistor coupled to receive a signal representing voltage information at an input of the second winding;
    a first capacitor coupled between the first resistor and a first sensing node; and
    a second capacitor coupled between the second resistor and a second sensing node, and a control circuit coupled with the first sensing node and the second sensing node, the control circuit to:
    receive a first voltage across the first capacitor, wherein the first voltage represents a current through the first winding of the first coupled inductor.

2. The circuit of claim 1, wherein the first resistor coupled to receive voltage information at the input of the first winding is coupled with an input of the first winding, and the second resistor coupled to receive voltage information at the input of the second winding is coupled with an input of the second winding.

3. The circuit of claim 2, comprising:
    a second sensing network coupled with the first coupled inductor, the second sensing network including:
    a third resistor coupled with the input of the second winding;
    a fourth resistor coupled with the input of the first winding;
    a third capacitor coupled between the third resistor and a third sensing node; and
    a fourth capacitor coupled between the fourth resistor and a fourth sensing node; and
    wherein the control circuit to:
    receive a second voltage across the third capacitor, wherein the second voltage represents a current through the second winding of the first coupled inductor.

4. The circuit of claim 2, comprising:
    a first switching circuit including a first switching element and a second switching element, the first winding coupled to a first switching node between the first switching element and the second switching element; and
    a second switching circuit including a third switching element and a fourth switching element, the second winding coupled to a second switching node between the third switching element and the fourth switching element, wherein the control circuit is coupled with the first switching circuit and the second switching circuit, the control circuit to:
    control operation of the first switching circuit and the second switching circuit using a timing phase.

5. The circuit of claim 4, wherein the first switching circuit and the second switching circuit are arranged in a buck regulator configuration.

6. The circuit of claim 4, wherein the first switching circuit and the second switching circuit are arranged in a boost regulator configuration.

7. The circuit of claim 1, comprising:
a first power stage assembly including:
a first switching circuit including a first switching element and a second switching element, the first winding coupled to a first switching node between the first switching element and the second switching element; and
a first signal source to output a first representation of a current through the first winding of the first coupled inductor, wherein the first representation includes a DC component of the current through the first winding of the first coupled inductor; and
a second power stage assembly including:
a second switching circuit including a third switching element and a fourth switching element, the second winding coupled to a second switching node between the third switching element and the fourth switching element; and
a second signal source to output a second representation of a current through the second winding of the first coupled inductor, wherein the second representation includes a DC component of the current through the second winding of the first coupled inductor, and the control circuit to receive the first and second representations of the current.

8. The circuit of claim 1, wherein the first resistor is coupled with a first output of the control circuit, and wherein the second resistor is coupled with a second output of the control circuit.

9. The circuit of claim 8, wherein the first coupled inductor includes a third winding, wherein the first sensing network includes a third resistor coupled in parallel with the second resistor, wherein the third resistor is coupled to a third output of the control circuit and coupled to receive a signal representing voltage information at an input of the third winding.

10. The circuit of claim 1, wherein the first resistor is coupled with an input of the first winding, and wherein the second resistor is coupled with an output of the control circuit.

11. The circuit of claim 10, wherein the first coupled inductor includes a third winding, wherein the control circuit is configured to generate a signal representing a combination of information about the second winding and the third winding, and wherein the second resistor coupled with the output of the control circuit is configured to receive the signal.

12. The circuit of claim 1, wherein the first sensing network further includes:
a third resistor and a third capacitor connected in series, wherein the series connection of the third resistor and the third capacitor is coupled in parallel with the first capacitor between the first sensing node and the second sensing node.

13. A method of sensing inductor winding current in a coupled inductor including a first winding and a second winding, the method including:
coupling a first resistor to receive a signal representing voltage information at an input of the first winding;
coupling a second resistor to receive a signal representing voltage information at an input of the second winding;
coupling a first capacitor between the first resistor and a first sensing node;
coupling a second capacitor between the second resistor and a second sensing node, wherein a sensing network includes the first resistor, the second resistor, the first capacitor, and the second capacitor; and
receiving a first voltage across the first capacitor, wherein the first voltage represents a current through the first winding of the coupled inductor.

14. The method of claim 13, comprising:
coupling the sensing network to a switching circuit including a first switching element and a second switching element, the first winding coupled to a first switching node between the first switching element and the second switching element; and
controlling operation of the switching circuit using a timing phase.

15. The method of claim 13, wherein coupling the first resistor to receive the voltage information at the input of the first winding includes: coupling the first resistor with an input of the first winding; and
wherein coupling the second resistor to receive the voltage information at the input of the second winding includes:
coupling the second resistor with an input of the second winding.

16. The method of claim 13, comprising:
coupling the first resistor with a first output of a control circuit; and
coupling the second resistor with a second output of the control circuit.

17. The method of claim 13, comprising:
coupling the first resistor with a first output of a control circuit, and coupling the second resistor with a second output of the control circuit.

18. A circuit comprising:
a first coupled inductor including a first winding and a second winding;
a first sensing network coupled with the first coupled inductor, the first sensing network including:
a first resistor coupled with an input of the first winding;
a second resistor coupled with an input of the second winding;
a first capacitor coupled between the first resistor and a first sensing node; and
a second capacitor coupled between the second resistor and a second sensing node, and a control circuit coupled with the first sensing node and the second sensing node, the control circuit to:
receive a first voltage across the first capacitor, wherein the first voltage represents a current through the first winding of the first coupled inductor.

19. The circuit of claim 18, comprising:
a first switching circuit including a first switching element and a second switching element, the first winding coupled to a first switching node between the first switching element and the second switching element; and
a second switching circuit including a third switching element and a fourth switching element, the second winding coupled to a second switching node between the third switching element and the fourth switching element, wherein the control circuit is coupled with the first switching circuit and the second switching circuit, the control circuit to:
control operation of the first switching circuit and the second switching circuit using a timing phase.

20. The circuit of claim 19, wherein the first switching circuit and the second switching circuit are arranged in a buck regulator configuration.

* * * * *